Patented Apr. 24, 1923.

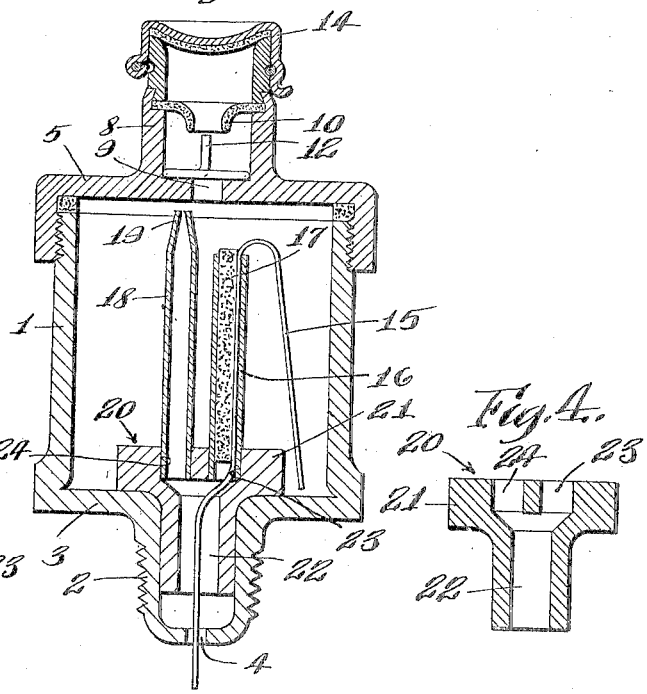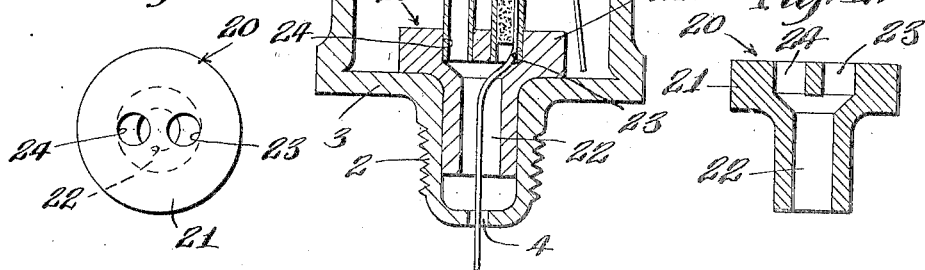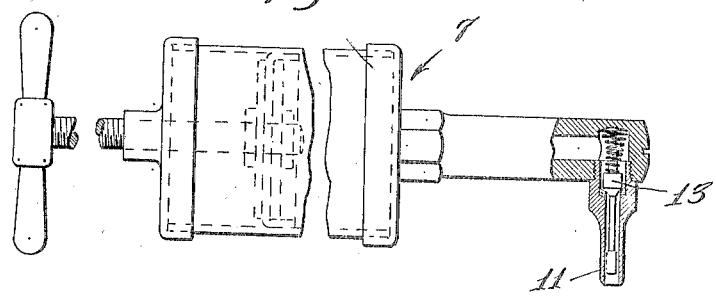

1,452,775

UNITED STATES PATENT OFFICE.

CHESTER A. BACON, OF AUBURN, NEW YORK, ASSIGNOR TO BOWEN PRODUCTS CORPORATION, OF AUBURN, NEW YORK, A CORPORATION OF NEW YORK.

LUBRICATING DEVICE.

Application filed September 20, 1921. Serial No. 501,902.

*To all whom it may concern:*

Be it known that I, CHESTER A. BACON, a citizen of the United States, and a resident of Auburn, in the county of Cayuga and State of New York, have invented a certain new and useful Lubricating Device, of which the following is a specification.

This invention relates to lubricating devices and has for its object a lubricating device by which the lubricant under normal working conditions is conducted slowly as needed to the part to be lubricated independent of the pressure of the lubricant and by which the part or bearing to be lubricated can be quickly lubricated or flushed when the lubricant is filled into the receptacle under pressure.

The invention consists in the novel features and in the combinations and constructions hereinafter set forth and claimed.

In describing this invention, reference is had to the accompanying drawings in which like characters designate corresponding parts in all the views.

Figure 1 is a vertical sectional view of a lubricant device or cup embodying one form of my invention.

Figure 2 is a fragmentary view partly in section and partly broken away of a filling means as a grease or oil gun for supplying lubricant under pressure.

Figure 3 is a plan view of the outlet member.

Figure 4 is a sectional view on line 3—3, Fig. 2.

This lubricating device comprises a closed cup or receptacle for receiving a lubricant under pressure, and having a slow discharge passage for conducting the lubricant from the receptacle slowly as needed under normal operating conditions and a fast feed discharge passage leading from the receptacle by which the lubricant is conducted to the bearing or part to be lubricated in order to flush the bearing when the lubricant is fed into the receptacle under pressure as from a grease or oil gun.

The receptacle may be of any suitable form, size and construction and as here illustrated, it comprises a cylindrical or cup shaped body 1 having an externally threaded nipple 2 depending from the bottom 3 thereof, the nipple having a discharge passage 4 opening into the bearing or part to be lubricated. The receptacle is further provided with a top 5 which closes the upper end thereof, it being here shown as a cap threading at 6 on the cylindrical wall of the body 1.

The receptacle is also provided with means preferably upon the top or cap 5 by means of which a coupling can be made with a grease or oil gun 7, this means here shown as consisting of a cup 8 having a discharge passage 9 into the receptacle 1, the cup having means as a washer 10 for contracting on the nozzle 11 of the oil or grease gun 7 and sealing the joint between the nozzle and the cup 8 and also having a valve opener 12 for opening the valve 13 in the nozzle 11 of the oil or grease gun, it being understood that the valve 13 normally closes the nozzle 11 in order that pressure may be built up in the oil or grease gun before it is applied to the cup 8 so that when the valve 13 in the nozzle 11 is opened by the valve opener 12, the grease or oil is forced by the internal pressure within the gun into the receptacle 1.

A suitable cap or lid 14 is provided for normally closing the upper end of the cup 8.

The construction of the oil or grease gun and the cup 8 having the coupling 10 forms no part of this invention, but forms the subject matter of my pending application, Sr. No. 487,987, filed July 27, 1921.

However, in so far as this invention, is concerned, any means may be employed for coupling to the receptacle 1 a device for supplying lubricant under pressure to the receptacle.

The means for slowly feeding the lubricant from the receptacle 1 as here shown, operates by capillary attraction to conduct the lubricant from the receptacle 1 to the bearing to be lubricated, and as here illustrated, this means consists of a braided wire wick 15 having one end portion located in the receptacle and terminating near the bottom thereof, the wick 15 extending through an upright conduit 16 which communicates at its lower end with the outlet 4 of the receptacle 1.

The conduit 16 is closed by a plug 17 of felt or other suitable material, so that the oil cannot pass except by the action of the capillary attraction due to the wick 15. Also, the plug 17 prevents the lubricant from passing back into the receptacle 1 when being forced through the fast feed conduit and also prevents the lubricant from passing through the conduit 16 under pressure.

18 designates the fast feed conduit which is located in the receptacle 1 and communicates at its lower end with the discharge passage 4 and which opens at its upper end near the top 5 of the receptacle into the receptacle. The upper end of the conduit 18 is contracted or tapered at 19 in order that the lubricant will not pass into the conduit under normal conditions, that is, in order that the oil will not slop over into the conduit during vibration of the receptacle.

As here shown, the conduits 16, 18 are mounted upon an outlet member 20 having a stem portion fitted within the nipple 2 of the receptacle, and a head portion 21 located in the receptacle, this outlet member having a passage 22 in its stem portion and branch passages 23 and 24 in the head thereof, which branch passages communicate with the conduits 16 and 18 respectively.

In operation, when the cup is being filled by reason of being coupled to a device as an oil gun from which lubricant is discharged under pressure, the lubricant fills into the receptacle 1 and when the receptacle is filled and the pressure of the filling device is continued, the lubricant passes through the fast feed 18 and out through the discharge passage 4 of the receptacle 1 to the bearing to be lubricated and flushes the bearing.

When the grease or oil gun or other device is disconnected so that the pressure is discontinued the oil ceases to pass through the fast feed tube 18 and thereafter slowly feeds along the wick 15 as needed in the bearing. Owing to the tapered upper end of the conduit 18 practically no oil slops into the tube 18 while the receptacle or cup is vibrating or is being subjected to the usual motions of such parts when mounted on a motor vehicle.

What I claim is:

1. A lubricating device comprising a normally closed receptacle for receiving a lubricant under pressure, slow feed and fast feed outlet conduits arranged to convey a lubricant from the receptacle, the fast feed conduit terminating and opening into the receptacle near the upper wall of the receptacle in order to convey the lubricant therefrom when the receptacle is full and the lubricant is under pressure, the fast feed conduit being tapered at its upper end and arranged to conduct the oil from the receptacle under the pressure of the lubricant in the receptacle, substantially as and for the purpose described.

2. A lubricating device comprising a receptacle for receiving a lubricant under pressure, the receptacle being formed with a nipple, for attachment to the part to be lubricated, the nipple having an outlet passage, a member arranged in the nipple and formed with a discharge passage opening through its lower end and branch passages opening in its upper end into the receptacle, a slow feed outlet conduit located in the receptacle and communicating with one of said passages, a fast feed conduit located in the other passage and arranged to conduct lubricant from the receptacle when the receptacle is full and the lubricant under pressure, substantially as and for the purpose specified.

3. In a lubricating device, a receptacle formed with means for connection to a part to be lubricated, an outlet conduit having means for conveying the lubricant from the receptacle by capillary attraction and a second outlet conduit arranged to convey lubricant from the receptacle, the second conduit being open and extending to near the top of the receptacle and being open at its upper end, substantially as and for the purpose set forth.

In testimony whereof, I have hereunto signed my name, at Auburn, in the county of Cayuga, and State of New York, this 6th day of August, 1921.

CHESTER A. BACON.